US006585917B2

(12) United States Patent
Sletson et al.

(10) Patent No.: US 6,585,917 B2
(45) Date of Patent: Jul. 1, 2003

(54) DIELECTRIC FLUID

(75) Inventors: Lisa C. Sletson, Waterford, WI (US);
Clay L. Fellers, Little Mountain, SC (US); Marco J. Mason, Racine, WI (US); Gary A. Gauger, Franklin, WI (US); Alan P. Yerges, Muskego, WI (US)

(73) Assignee: Cooper Industries, Inc., Houston, TX (US)

( * ) Notice: Subject to any disclaimer, the term of this patent is extended or adjusted under 35 U.S.C. 154(b) by 0 days.

(21) Appl. No.: 09/832,887

(22) Filed: Apr. 12, 2001

(65) Prior Publication Data

US 2002/0179890 A1 Dec. 5, 2002

(51) Int. Cl.[7] .............................. H01B 3/24; H01B 1/00
(52) U.S. Cl. ........................ 252/570; 252/500; 427/29; 361/314; 361/315
(58) Field of Search ................................ 252/570, 500; 427/79; 361/315, 314

(56) References Cited

U.S. PATENT DOCUMENTS

| 4,054,937 A | 10/1977 | Mandelcorn et al. |
|---|---|---|
| 4,320,034 A | 3/1982 | Lapp et al. |
| 4,591,948 A | 5/1986 | Sato et al. |
| 4,631,632 A | 12/1986 | Kano et al. |
| 4,642,730 A | 2/1987 | Sato et al. |
| 4,716,084 A | 12/1987 | Sato et al. |
| 4,734,824 A | 3/1988 | Sato et al. |
| 4,744,000 A | 5/1988 | Mason et al. |
| 4,750,083 A | 6/1988 | Sato et al. |
| 4,870,221 A | 9/1989 | Sato et al. |
| 4,902,841 A | 2/1990 | Kawakami et al. |
| 4,967,028 A | 10/1990 | Sato et al. |
| 5,015,793 A | 5/1991 | Sato et al. |
| 5,017,733 A | 5/1991 | Sato et al. |
| 5,081,757 A | 1/1992 | Sato et al. |
| 5,081,758 A | 1/1992 | Sato et al. |
| 5,107,395 A | 4/1992 | Kawakami et al. |
| 5,192,463 A | * 3/1993 | Berger et al. ................ 252/570 |
| 6,010,743 A | * 1/2000 | Berger .......................... 427/79 |
| 6,154,357 A | * 11/2000 | Berger ......................... 361/314 |

OTHER PUBLICATIONS

W. M. Hurst, et al, *Power Capacitor Technology: Progress through Innovation*, Cooper Power Systems Bulletin 86014 Apr. 1992.
*Capacitors: Cooper Power Systems Contributions to the Capacitor Industry*, Jan. 1999, Cooper Power Systems Bulletin 98060.
*Power Capacitors; McGraw–Edison® Type EX–7L™ Single–Phase Units And Accessories*; Oct. 1999, Cooper Power Systems Bulletin.
*Cooper Power Systems capacitors you can count on down the line.*, 1989 Cooper Industries, Inc.
*Laser EX–7L Capacitor*, Feb. 1990, Cooper Power Systems Bulletin 90007.
*The EX–7L Power Capacitor: The Inside Story*, Feb. 1990, Cooper Power Systems Bulletin 88010.
*Extended–Foil Solderless EX Capacitor*, Apr. 1992, Cooper Power Systems Bulletin 86001.
*EX–D™*, Mar. 1995, Cooper Power Systems Bulletin 95003.
*The World Counts of Capacitors from Cooper Power Systems*, Sep. 1992, Cooper Power Systems Bulletin 90045.

* cited by examiner

Primary Examiner—Yogendra N. Gupta
Assistant Examiner—Derrick G. Hamlin
(74) Attorney, Agent, or Firm—Fish & Richardson P.C.

(57) ABSTRACT

A dielectric fluid with improved performance in capacitors contains 65% by weight or more monobenzyltoluene. Capacitors including the dielectric fluid can have improved discharge extinction voltages at 60° C.

20 Claims, 2 Drawing Sheets

DIELECTRIC FLUID

TECHNICAL FIELD

The invention relates to a dielectric fluid, in particular a dielectric fluid for a capacitor.

BACKGROUND

Capacitors are electrical devices that can be used to store an electrical charge. A capacitor can include a capacitor pack containing conducting plates separated by a non-conductive material, such as a polymer film. The conducing plates and polymer film can be rolled to form windings, which can be housed within a casing, such as a metal or plastic housing. The casing protects and electrically isolates the windings from the environment. In power factor correction capacitors, the windings are typically immersed in a dielectric fluid. The dielectric fluid serves as an insulating material that can help prevent charge breakdown between plates in the capacitor. If these spaces are not filled with a suitable dielectric material, partial discharge can occur under electrical stress, leading to device failure. Conventional dielectric fluids include phenyl orthoxylyl ethane, isopropyl biphenyl, a mixture of methyl diphenyl ethane and lower alkyl diphenyl, mono and dibenzyltoluene, or phenyl xylyl ethane.

SUMMARY

A dielectric fluid that provides improved performance in capacitors contains 65% by weight or more monobenzyltoluene. Capacitors including the dielectric fluid can have higher discharge extinction voltages at 60° C., and can have increased failure voltages in comparison to capacitors made using a fluid including 60% by weight monobenzyltoluene and 40% by weight diphenylethane. The dielectric fluid can have a low viscosity and low vapor pressure.

In one general aspect, an electrical capacitor includes a casing and a dielectric fluid in the casing. The dielectric fluid includes 65 to 95% by weight of monobenzyltoluene and 5 to 35% by weight of diphenylethane.

In another general aspect, an electrical capacitor includes a dielectric fluid consisting essentially of 65 to 95% by weight of monobenzyltoluene, 5 to 35% by weight of diphenylethane, and up to 5% by weight of a scavenger.

In another general aspect, a dielectric fluid includes 65 to 95% by weight of monobenzyltoluene, 5 to 35% by weight of diphenylethane, and up to 5% by weight of a scavenger.

In another general aspect, a method of making an electrical capacitor including adding a dielectric fluid to a casing. The dielectric fluid includes 60 to 95% by weight of monobenzyltoluene and 5 to 40% by weight of diphenylethane. The dielectric fluid can be added with the casing under reduced pressure. Prior to addition, the dielectric fluid can be heated under reduced pressure.

In another general aspect, an electrical capacitor includes a casing and a dielectric fluid in the casing. The dielectric fluid includes monobenzyltoluene and diphenylethane. The capacitor has a rated voltage and fails a 55° C. step stress test at greater than 180% of the rated voltage. The capacitor can fail a −40° C. step stress test at greater than 160% of the rated voltage.

The dielectric fluid can include 70 to 90% by weight of monobenzyltoluene and 10 to 30% by weight of diphenylethane. The dielectric fluid also can include up to 5% by weight of a scavenger, or, in some implementations, 0.01 to 2% by weight of a scavenger.

The capacitor can include capacitor packs disposed within the casing. The capacitor can have an extinction voltage of greater than 3.0 kV at 60° C.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
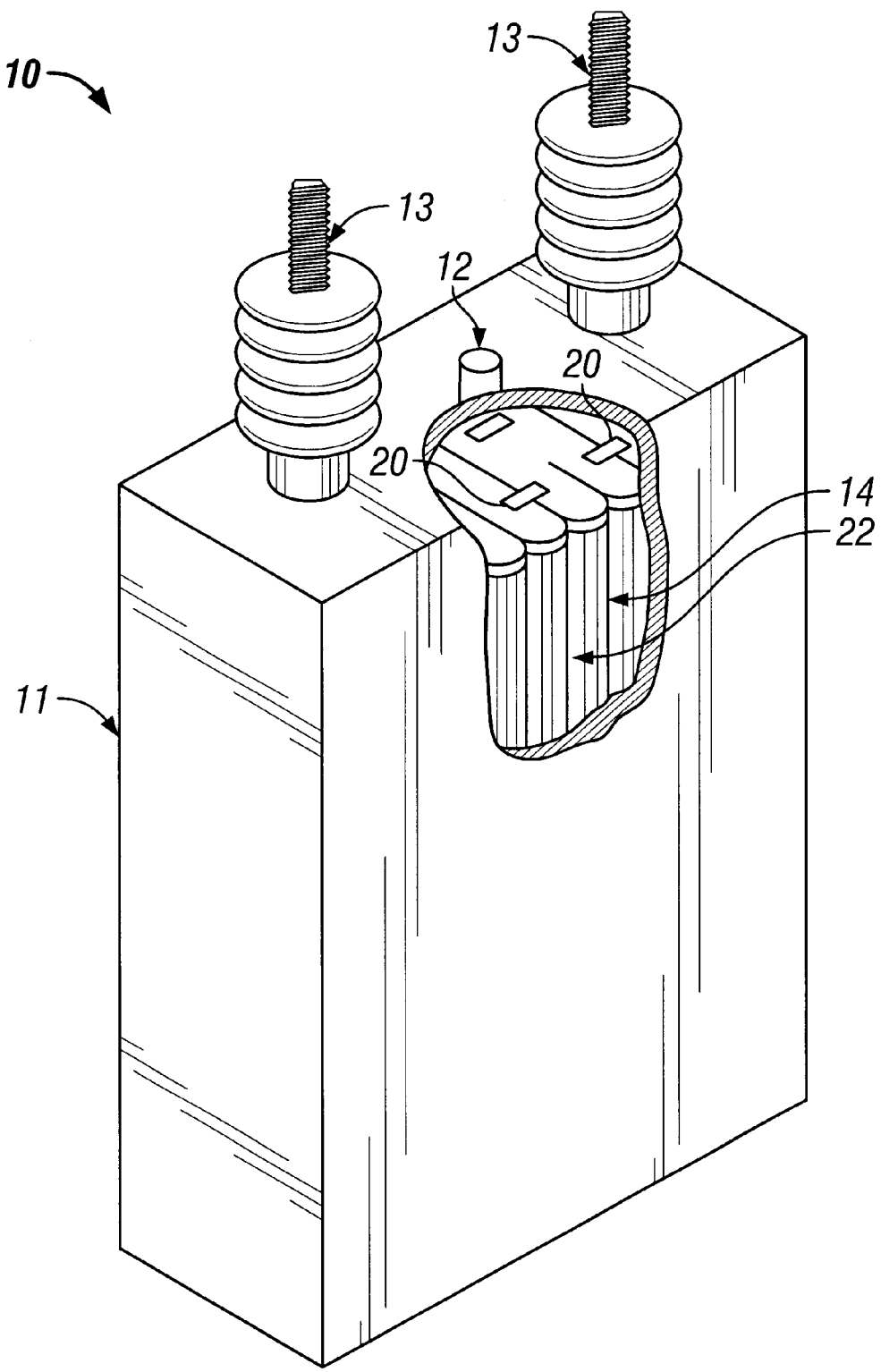
FIG. 1 is a perspective view of a capacitor.

Referring to FIG. 1, capacitor 10 includes casing 11, which encloses capacitor packs 14. Fill tube 12 is positioned at the top of casing 11, which allows the internal region of the capacitor to be dried under reduced pressure and permits dielectric fluid 22 to be added to the capacitor.

Figure 2:
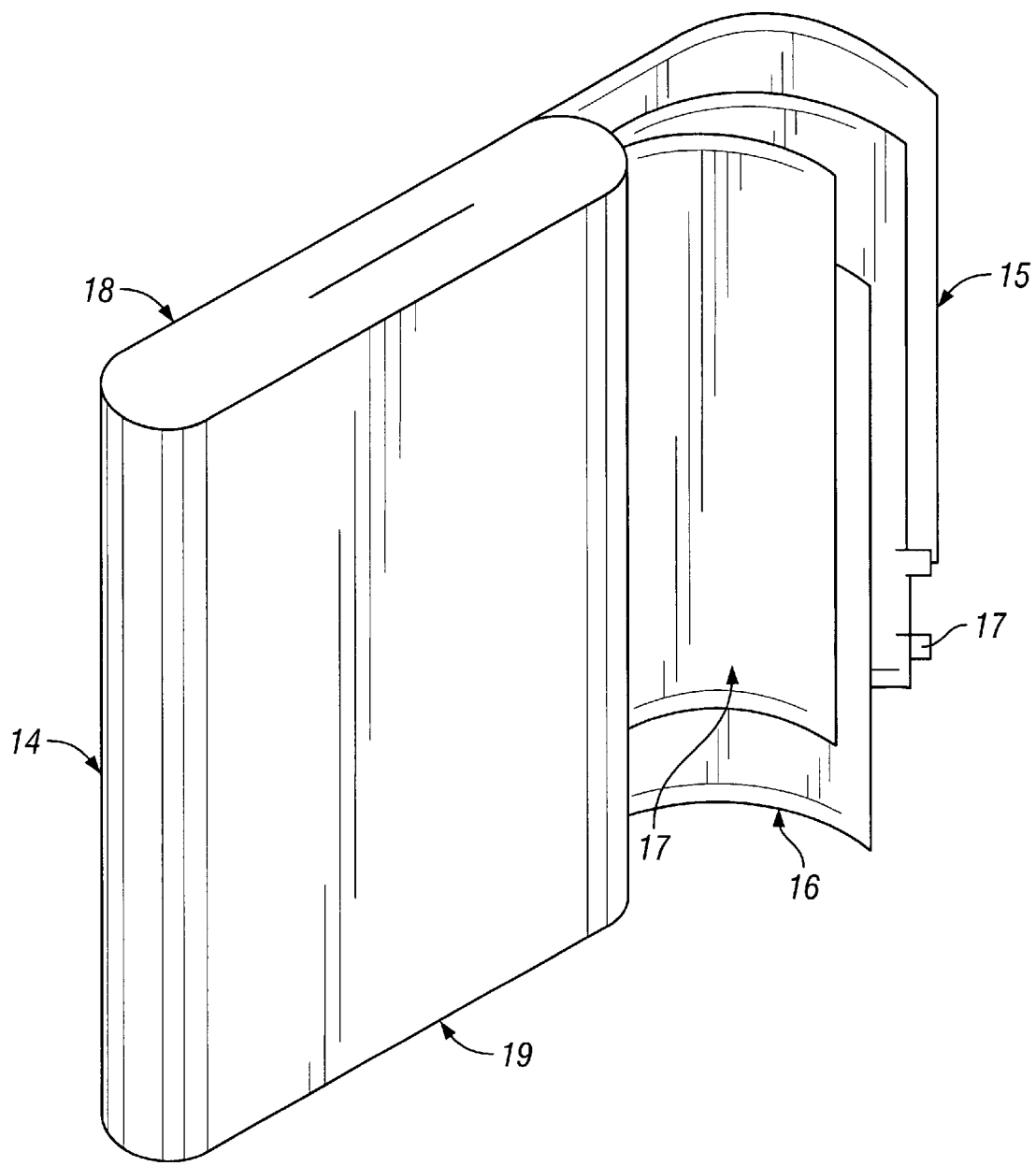
FIG. 2 is a perspective view of a capacitor pack.

Referring to FIG. 2, capacitor pack 14 includes two wound layers of metal foil 15, 16 separated by a dielectric layer 17. Dielectric layer 17 can be composed of multiple layers. Foils 15, 16 are offset with respect to dielectric layer 17 and with respect to each other such that foil 15 extends above dielectric layer 17 at pack top 18 and foil 16 extends below dielectric layer 17 at pack bottom 19.

Referring to FIG. 1, capacitor packs 14 can be connected together by a crimp 20 that holds the extended portions of foils 15, 16 of one pack in intimate contact with extended foils of adjacent packs. The extended portions of foils 15, 16 can be insulated from adjacent packs to provide a series arrangement of packs 14 in capacitor 10. After dielectric fluid 22 has been added to capacitor 10 through tube 12, the internal region of the capacitor is sealed, for example, by crimping tube 12. Two terminals 13, which are electrically connected to crimps near the end packs by lead wires (not shown), project through the top of casing 11. At least one terminal is insulated from casing 11. Terminals 13 can be connected to an electrical system.

Referring to FIG. 2, foils 15, 16 can be formed of any desired electrically conductive material, such as, for example, aluminum, copper, chromium, gold, molybdenum, nickel, platinum, silver, stainless steel, or titanium. Dielectric layer 17 can be composed of polymeric film or kraft paper. The polymeric film may be made, for example, from polypropylene, polyethylene, polyester, polycarbonate, polyethylene terephthalate, polyvinylidene fluoride, polysulfone, polystyrene, polyphenylene sulfide, polytetrafluoroethylene, or similar polymers. Surface of dielectric layer 17 of foils 15, 16 have surface irregularities or deformations sufficient to allow the dielectric fluid to penetrate the wound pack and impregnate the spaces between the foils and the dielectric layer.

The dielectric fluid is composed of a mixture of monobenzyltoluene and diphenylethane. The monobenzyltoluene can be a mixture of isomers of monobenzyltoluene. In particular, the monobenzyltoluene can include combinations of ortho-monobenzyltoluene, meta-monobenzyltoluene, and para-monobenzyltoluene. In particular compositions, the monobenzyltoluene can include less than 6% ortho-monobenzyltoluene, 52–64% meta-monobenzyltoluene, and 30–42% para-monobenzyltoluene. The diphenylethane can include 1,1-diphenylethane and 1,2-diphenylethane. The diphenylethane can include greater than 50%, 70%, 80%, or 90% by weight 1,1-diphenylethane, with greater levels being generally preferred. The diphenylethane can also include less than 50%, 30%, 20% or 10% by weight 1,2-diphenylethane, with lesser levels being preferred. In particular implementations, the diphenylethane can be a mixture including 92% to 98% by weight 1,1-diphenylethane and 8% to 2% by weight 1,2-diphenylethane.

The dielectric fluid can include a scavenger. The scavenger can neutralize decomposition products that are released or generated within the capacitor during operation. The scavenger can improve the service life of the capacitor. The dielectric fluid can include up to 5% by weight, and, in some implementations, from about 0.01% to 2% by weight of a scavenger. The scavenger can be an epoxy compound, an epoxy compound that is soluble in the dielectric fluid. Suitable epoxy compounds include 1,2-epoxy-3-phenoxypropane, bis(3,4-epoxycyclohexylmethyl) adipate, 3,4-epoxycyclohexylmethyl-(3,4-epoxy)cyclohexane carboxylate, bis(3,4-epoxy-6-methylcyclohexylmethyl) adipate, 3,4-epoxy-6-methylcyclohexylmethyl-4-epoxy-6-methylcyclohexanecarboxylate, diglycidyl ethers of bisphenol A, or similar compounds.

The dielectric fluid can also include up to 1.0% by weight of an antioxidant, and, in some implementations, 0.01% to 0.2%. The antioxidant can be a phenol, such as a hindered phenol. The hindered phenol can be di-t-butylphenol, di-t-butyl-paracresol, or other hindered phenols. In addition, the dielectric fluid can include up to 2% by weight and, in some implementations, 0.01% to 0.5% by weight of an agent to improve the discharge resistance, such as an anthraquinone compound, including, for example, anthraquinone, beta-methylanthraquinone, or beta-chloranthraquinone.

The dielectric fluid can have a viscosity low enough to allow complete and rapid filling of the capacitor. The viscosity can be determined by ASTM D445. The viscosity can be less than 13 centistokes at −20° C., less than 2.60 centistokes at 40° C., and less than 1.08 centistokes at 100° C. The dielectric fluid can have a vapor pressure of less than $12 \times 10^{-3}$ Torr at 25° C., measured by gas chromatography, as described, for example, in Anal. Chem. (1984) 56:2490–2496.

The dielectric fluid is added to the capacitor after the capacitor is dried under reduced pressure. Specifically, the capacitor casing containing the capacitor packs can be dried for a period of time sufficient to remove water vapor and other gases from the interior of the capacitor. A pressure of less than 500 microns is usually employed, with some implementations using a pressure below 100 microns. A drying period longer than 40 hours can be used, although the time period depends on the magnitude of the reduced pressure. Drying can take place at a temperature higher than room temperature, and generally can be conducted at temperatures less than 60° C.

The dielectric fluid is also degassed prior to introducing it into the capacitor. The fluid can be subjected to reduced pressure treatment, for example, at a pressure of less than 200 microns, or less than 100 microns. The fluid can be agitated, for example by circulation, stirring or mixing, to assist in the degassing process. The time of degassing depends upon the viscosity of the fluid, the magnitude of the reduced pressure, and the type of agitation used. In general, the fluid can be degassed for 12 hours or longer. The temperature of the fluid during degassing can maintained at a temperature below 60° C., such as room temperature.

The degassed dielectric fluid can be introduced into the evacuated capacitor casing by adding the fluid to the capacitor through the tube. After filling, reduced pressure can be applied to the interior of the capacitor to soak the fluid into the packs. A soak time of twelve hours or more can be used. Positive pressure, for example, in the range of about 0.1 to 5.0 psig, can then be applied to the interior of the capacitor for a period of about 6 hours or more to assist in impregnating the packs with the fluid. The casing can then be sealed, for example, while maintaining some positive pressure.

EXAMPLES

The viscosities of three compositions of dielectric fluid including monobenzyltoluene and diphenylethane were tested according to ASTM D445. The results are summarized in Table 1. The dielectric compositions including greater than 60% by weight monobenzyltoluene (Example 2 and Example 3) had lower viscosities at −20° C., 40° C., and 100° C. than a comparative fluid (Comparative Example 1). The compositions included 0.7% by weight bis(3,4-epoxycyclohexylmethyl) adipate. The overall vapor pressures of the components of the dielectric fluid determined by gas chromatography are summarized in Table 2, as described, for example, in Anal. Chem. (1984) 56:2490–2496. The lower viscosities and vapor pressures can improve the ability to process the capacitors under more extreme reduced-pressures and improve impregnation of the dielectric layer.

TABLE 1

| | | Viscosity (centistokes) Temperature | | |
|---|---|---|---|---|
| | Composition (% by weight) | −20° C. | 40° C. | 100° C. |
| Comparative Example 1 | 60% monobenzyltoluene 40% diphenylethane | 13.5 | 2.60 | 1.08 |
| Example 2 | 81% monobenzyltoluene 19% diphenylethane | 11.8 | 2.52 | 1.07 |
| Example 3 | 86% monobenzyltoluene 14% diphenylethane | 11.0 | 2.48 | 1.07 |

TABLE 2

| | Vapor Pressure (Torr at 25° C.) | |
|---|---|---|
| | Component 1 | Component 2 |
| monobenzyltoluene | $7.94 \times 10^{-3}$ | $6.62 \times 10^{-3}$ |
| diphenylethane | $11.4 \times 10^{-3}$ | |

Minicapacitor samples were constructed to test the performance of the dielectric fluids. The minicapacitors had the following characteristics: 1 mil pad thickness, 2200 V rated, 15 inches in active area, 14–15 nf capacitance. Minicapacitors containing three dielectric fluid compositions were tested. The fluid compositions were as follows:

| Comparative Example 1 | 60 wt % monobenzyltoluene | 40% diphenylethane |
|---|---|---|
| Example 2 | 78 wt % monobenzyltoluene | 22% diphenylethane |
| Example 3 | 86 wt % monobenzyltoluene | 14% diphenylethane |

The capacitors were filled as follows. The casings were placed in a vacuum chamber al room temperature under atmospheric conditions and then a vacuum was pulled for four days at a level of between 25 and 30 microns of Hg.

After this step, the fluid was introduced into the vacuum chamber to impregnate the capacitor. The vacuum level in the chamber did not exceed 50 microns during filling and impregnation and was maintained for four days.

The capacitors were subjected to the following stress levels at 60° C. ambient temperature to age the capacitors:

| Time | Stress Voltage |
| --- | --- |
| 0 to 500 hr | 1.23 × Rated Voltage |
| 500 to 5500 hr | 1.36 × Rated Voltage |
| 5500 to 10000 hr | 1.50 × Rated Voltage |

Tests were conducted to determine the discharge inception voltage and discharge extinction voltage at 60° C. for minicapacitors containing the fluid of Comparative Example 1, Example 2, and Example 3. Capacitance and tan delta were determined using a Haefely Capacitance and Tan delta bridge type 470 and a Haefely Capacitance and Tan Delta Null Detector Type 471 (for balancing). Partial discharge was tested using a voltage supply including an American High Voltage Test System metering and control module AC DIE 600D. The actual partial discharge was measured with a Biddle partial discharge detector. The test parameters for partial discharge testing for discharge inception voltage were: 1000 V/sec to about 3500V rms, after this voltage the rate is changed to 100 V/sec until the discharge inception voltage. The test parameters for partial discharge testing for discharge extinction voltage were: 1000 V/sec down to 4000 V rms, 100 V/sec down to the extinction voltage detection.

The test data are summarized in Table 3.

TABLE 3

| Discharge test at 60° C. | Comparative Example 1 | Example 2 | Example 3 |
| --- | --- | --- | --- |
| 0 hr inception | 4.4 kV | 4.4 kV | 4.6 kV |
| 0 hr extinction | 3.6 kV | 3.4 kV | 3.5 kV |
| 10000 hr inception | 5.2 kV | 5.3 kV | 5.0 kV |
| 10000 hr extinction | 3.0 kV | 3.3 kV | 3.4 kV |

The discharge extinction voltage at 60° C. of the minicapacitors including dielectric fluid containing greater than 65% by weight monobenzyltoluene after 10000 hours is improved in comparison to the performance of the minicapacitor containing the fluid of Comparative Example 1.

The performance of full size prototype capacitors containing the dielectric fluid were tested under a variety of conditions (200 kVAR, rated voltage of 7200 V, 1.2 mil pad thickness, 81 wt % monobenzyltoluene, 19 wt % diphenylethane). The results of the tests are summarized in Table 4.

55° C. Heat Run Test

The capacitor was operated for 24 hours at rated voltage at 55° C. The voltage was then raised to 125% of rated voltage and the capacitor was operated for another 72 hours at 55° C. The tank surface temperature of the capacitor was monitored throughout this period. The capacitor successfully passed the test if the tank temperature stabilized to less than a 3° C. change over a 24 hour period and a breakdown of the dielectric did not occur.

55° C. Step Stress Test

The capacitor was equilibrated, unenergized, at 55° C. overnight. The ambient temperature was maintained at 55° C. throughout the test. The capacitor was energized and operated for 30 minutes at 130% of the rated voltage. The capacitor was then de-energized for a period of at least 4 hours. Subsequent to de-energizing, the capacitor was re-energized and operated for 30 minutes at 140% of rated voltage. The capacitor was de-energized overnight. The de-energize/re-energize cycles were repeated at increased voltage (i.e., at 150%, 160%, 170%, 180%, and 190% of rated voltage) until a dielectric failure occurred.

4.3 DC Test

A DC voltage of 4.3 times the rated voltage (rms) was applied to the capacitor for 10 seconds. The capacitor successfully passed the test if a breakdown of the dielectric did not occur.

65 Hour Sample Test

The capacitor was operated at 130% of rated voltage for 65 hours at room temperature. The capacitor successfully passed the test if a breakdown of the dielectric did not occur.

−40° C. Step Stress Test

The capacitor was equilibrated, unenergized, at −40° C. overnight. The ambient temperature was maintained at −40° C. throughout the test. The capacitor was energized and operated for 30 minutes at 130% of rated voltage. The capacitor was then de-energized for a period of at least 4 hours. After de-energizing, the capacitor was re-energized and operated for 30 minutes at 140% of rated voltage. The capacitor was de-energized overnight. The re-energize/de-energize steps were repeated as increased voltage (i.e., at 150%, 160%, 170%, and 180% of rated voltage) until a dielectric failure occurred.

The performance of the prototype capacitor containing the fluid of Example 2 was improved relative to the prototype capacitor containing the fluid of Comparative Example 1.

TABLE 4

| Test | Comparative Example 1 | Example 2 |
| --- | --- | --- |
| +55° C. Heat Run and +55° C. Step Stress Test | 180% of Rated Voltage | 190% of Rated Voltage |
| 4.3 DC | P | P |
| 65 Hour Sample Test | P | P |
| −40° C. Step Stress Test | 160% Rated Voltage | 180% Rated Voltage |

A number of embodiments of the invention have been described. Nevertheless, it will be understood that various modifications may be made without departing from the spirit and scope of the invention. For example, in addition to power factor correction capacitors, the dielectric fluid can be used in other capacitors, such as energy storage capacitors, filter capacitors, high current discharge capacitors, as well as other electrical devices which require a dielectric insulating liquid to limit the occurrence of partial discharges in the spaces between conductors of differing electrical potential. Accordingly, other embodiments are within the scope of the following claims.

What is claimed is:

1. An electrical capacitor comprising a casing and a dielectric fluid in the casing, the dielectric fluid comprising 65 to 95% by weight of monobenzyltoluene and 5 to 35% by weight of diphenylethane.

2. The capacitor of claim 1 wherein the dielectric fluid comprises 70 to 90% by weight of monobenzyltoluene.

3. The capacitor of claim 1 wherein the dielectric fluid comprises 10 to 30% by weight of diphenylethane.

4. The capacitor of claim 1 wherein the dielectric fluid comprises 70 to 90% by weight of monobenzyltoluene and 10 to 30% by weight of diphenylethane.

5. The capacitor of claim 1 wherein the dielectric fluid includes up to 5% by weight of a scavenger.

6. The capacitor of claim 1 wherein the dielectric fluid includes 0.01 to 2% by weight of a scavenger.

7. The capacitor of claim 1 further comprising capacitor packs disposed within the casing.

8. An electrical capacitor comprising a casing and a dielectric fluid in the casing, the dielectric fluid consisting essentially of 65 to 95% by weight of monobenzyltoluene, 5 to 35% by weight of diphenylethane, and up to 5% by weight of a scavenger.

9. The capacitor of claim 8 wherein the dielectric fluid includes 70 to 90% by weight of monobenzyltoluene.

10. The capacitor of claim 8 wherein the dielectric fluid includes 10 to 30% by weight of diphenylethane.

11. The capacitor of claim 8 wherein the dielectric fluid includes 0.01 to 2% by weight of a scavenger.

12. A dielectric fluid comprising 65 to 95% by weight of monobenzyltoluene, 5 to 35% by weight of diphenylethane, and up to 5% by weight of a scavenger.

13. The dielectric fluid of claim 12 wherein the dielectric fluid includes 70 to 90% by weight of monobenzyltoluene.

14. The dielectric fluid of claim 12 wherein the dielectric fluid includes 10 to 30% by weight of diphenylethane.

15. A method of making an electrical capacitor comprising:

providing a casing; and adding a dielectric fluid to the casing, the dielectric fluid comprising 60 to 95% by weight of monobenzyltoluene and 5 to 40% by weight of diphenylethane.

16. The method of claim 15 wherein the dielectric fluid includes 70 to 90% by weight of monobenzyltoluene.

17. The method of claim 15 wherein the dielectric fluid includes 10 to 30% by weight of diphenylethane.

18. The method of claim 15 wherein the dielectric fluid is added with the casing under reduced pressure.

19. An electrical capacitor comprising a casing and a dielectric fluid in the casing, the dielectric fluid comprising greater than 65% by weight monobenzyltoluene and diphenylethane, the capacitor having a rated voltage and failing a 55° C. step stress test at greater than 180% of the rated voltage.

20. The capacitor of claim 19 wherein the capacitor fails a −40° C. step stress test at greater than 160% of the rated voltage.

* * * * *